(12) United States Patent  
O'Dea

(10) Patent No.: US 8,621,988 B1
(45) Date of Patent: Jan. 7, 2014

(54) INVERTED SUSPENSION POULTRY ROASTING RACK

(76) Inventor: Francis D. O'Dea, Arlington, VA (US)

( * ) Notice: Subject to any disclaimer, the term of this patent is extended or adjusted under 35 U.S.C. 154(b) by 256 days.

(21) Appl. No.: 13/294,356

(22) Filed: Nov. 11, 2011

(51) Int. Cl.
A47J 37/04 (2006.01)

(52) U.S. Cl.
USPC ............ 99/421 V; 99/419; 99/347; 211/181.1

(58) Field of Classification Search
USPC .............. 99/419, 421 V, 347, 345; 211/181.1
See application file for complete search history.

(56) References Cited

U.S. PATENT DOCUMENTS

| 831,147 | A | * | 9/1906 | Crompton | ........................ 223/81 |
| 4,027,583 | A | | 6/1977 | Spanek | |
| D280,065 | S | | 8/1985 | Pierscinski | |
| 5,442,999 | A | * | 8/1995 | Meister | ........................... 99/426 |
| D363,000 | S | | 10/1995 | Buff, IV | |
| 5,791,235 | A | | 8/1998 | Anselmo | |
| 6,104,017 | A | * | 8/2000 | Kim et al. | ..................... 219/732 |
| D558,521 | S | | 1/2008 | Fouse | |
| D612,693 | S | | 3/2010 | Accardo | |
| 2005/0279223 | A1 | * | 12/2005 | McPeak | ......................... 99/419 |
| 2006/0266227 | A1 | | 11/2006 | Britt | |

FOREIGN PATENT DOCUMENTS

DE 4116485 * 10/1991 ................. 211/181.1

* cited by examiner

*Primary Examiner* — Reginald L Alexander
(74) *Attorney, Agent, or Firm* — Michael S. Neustel

(57) ABSTRACT

An inverted suspension poultry roasting rack for supporting a poultry in an inverted position with only the interior portion of the poultry making physical contact with the support rack. The inverted suspension poultry roasting rack generally includes a base unit, a first member extending upwardly from the base unit at a first angle with respect to the base unit, a second member extending upwardly from the first member, a third member extending downwardly from the second member at a second angle with respect to the base unit, and a hook extending from the distal portion of the third member. A poultry is positioned upon the third member and retained in an inverted position for cooking.

19 Claims, 9 Drawing Sheets

INVERTED SUSPENSION POULTRY ROASTING RACK

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to poultry cooking racks and more specifically it relates to an inverted suspension poultry roasting rack for supporting a poultry in an inverted position with only the interior portion of the poultry making physical contact with the support rack.

2. Description of the Related Art

Any discussion of the related art throughout the specification should in no way be considered as an admission that such related art is widely known or forms part of common general knowledge in the field.

Conventional poultry racks support the poultry (e.g. chicken, duck, game hen, goose, etc.) in a vertical or horizontal manner. In addition, conventional poultry racks typically make physical contact with the exterior surface of the poultry during cooking resulting in uneven cooking and burning in locations.

Because of the inherent problems with the related art, there is a need for a new and improved inverted suspension poultry roasting rack for supporting a poultry in an inverted position with only the interior portion of the poultry making physical contact with the support rack.

BRIEF SUMMARY OF THE INVENTION

The invention generally relates to a poultry cooking rack which includes a base unit, a first member extending upwardly from the base unit at a first angle with respect to the base unit, a second member extending upwardly from the first member, a third member extending downwardly from the second member at a second angle with respect to the base unit, and a hook extending from the distal portion of the third member. A poultry is positioned upon the third member and retained in an inverted position for cooking.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
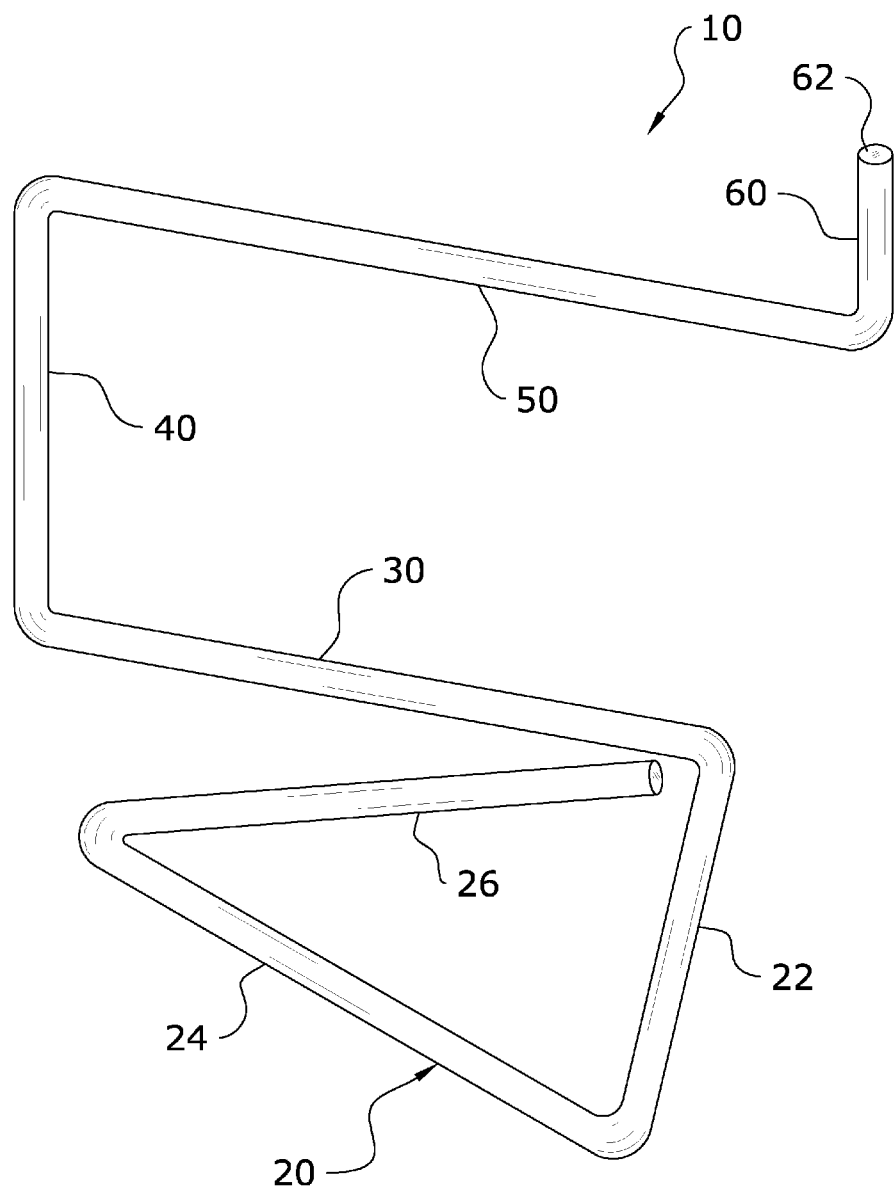
FIG. 1 is an upper perspective view of the present invention.

A. Overview.

Turning now descriptively to the drawings, in which similar reference characters denote similar elements throughout the several views, FIGS. 1 through 9 illustrate an inverted suspension poultry roasting rack 10, which comprises a base unit 20, a first member 30 extending upwardly from the base unit 20 at a first angle with respect to the base unit 20, a second member 40 extending upwardly from the first member 30, a third member 50 extending downwardly from the second member 40 at a second angle with respect to the base unit 20, and a hook 60 extending from the distal portion of the third member 50. A poultry 12 is positioned upon the third member 50 and retained in an inverted position for cooking.

B. Poultry.

Figure 5:
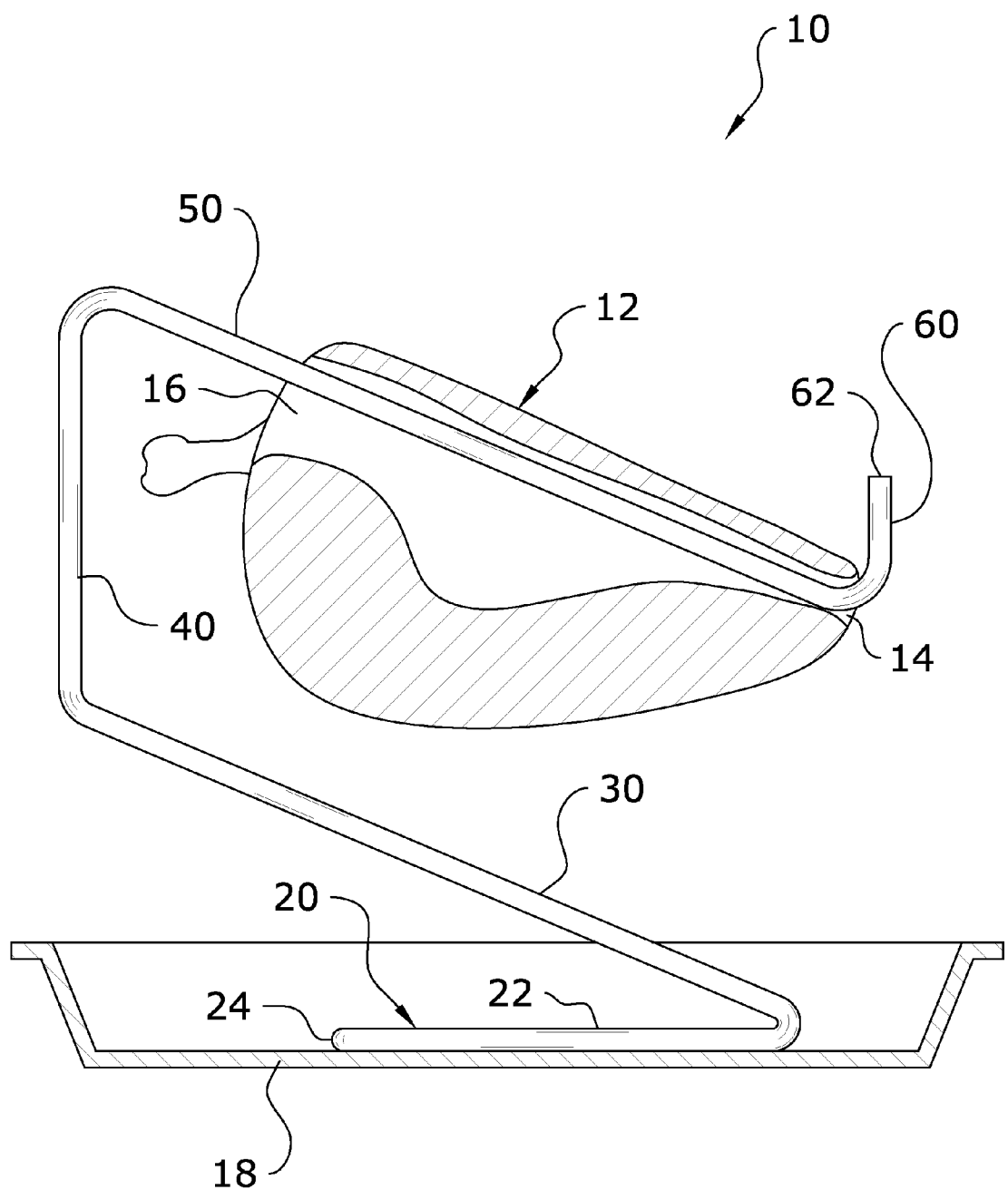
FIG. 5 is a side view of the present invention supporting a poultry in an inverted manner with the breast facing downwardly with the poultry shown in cutaway.

The present invention is designed to receive and support various types of poultry 12 (e.g. chicken, duck, game hens, goose, etc.). The poultry 12 has a neck opening 14 and a rear opening 16 with an interior body cavity as illustrated in FIG. 5. The present invention is designed to support the poultry 12 so that the breast portion of the poultry 12 is the lowest portion of the poultry 12 with the legs supported higher to allow for the poultry 12 to cook more evenly since the legs take longer to cook.

C. Pan.

The present invention may be supported within a convention oven rack or preferably upon a pan 18 to catch any drippings. The pan 18 may be comprised of any type of flat cooking item such as but not limited to a sheet pan 18 or roasting pan 18.

D. Base Unit.

The base unit 20 is removably positionable upon the pan 18 and has a flat lower portion. The base unit 20 is preferably comprised of a broad structure to provide adequate support to the structure when supporting the poultry 12.

Figure 2:
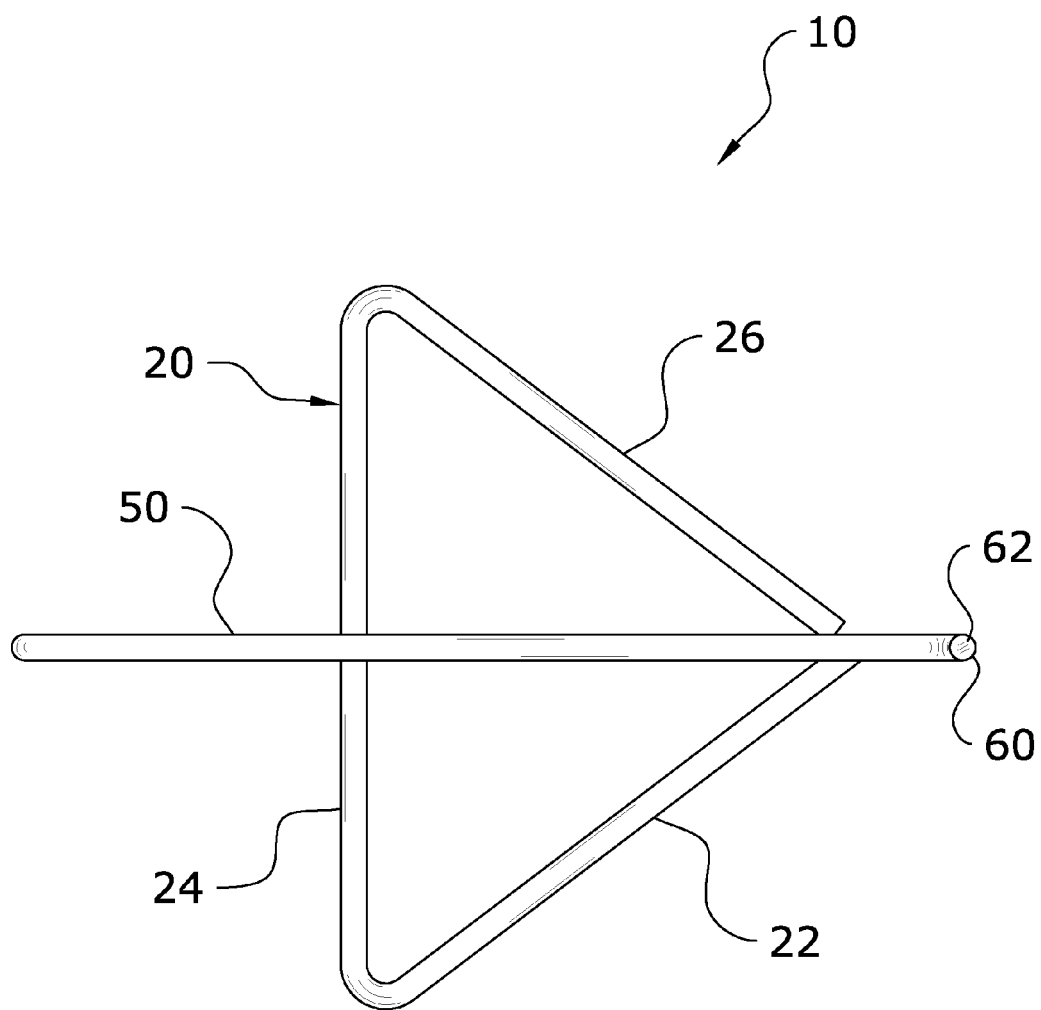
FIG. 2 is a top view of the present invention.

As illustrated in FIG. 2, the base unit 20 is preferably comprised of a triangular shape, with the first member 30 extending from one of the pointed ends and the first member 30 extending over the base unit 20 in a central manner as further shown in FIG. 2 of the drawings. In particular, the base unit 20 is preferably comprised of a first base member 22 connected to the second member 40, a second base member 24 extending at an acute angle from the first base member 22, and a third base member 26 extending at an acute angle from the second base member 24. The third base member 26 does not need to be connected to the first base member 22, however the third base member 26 may be attached.

E. First Member.

Figure 3:
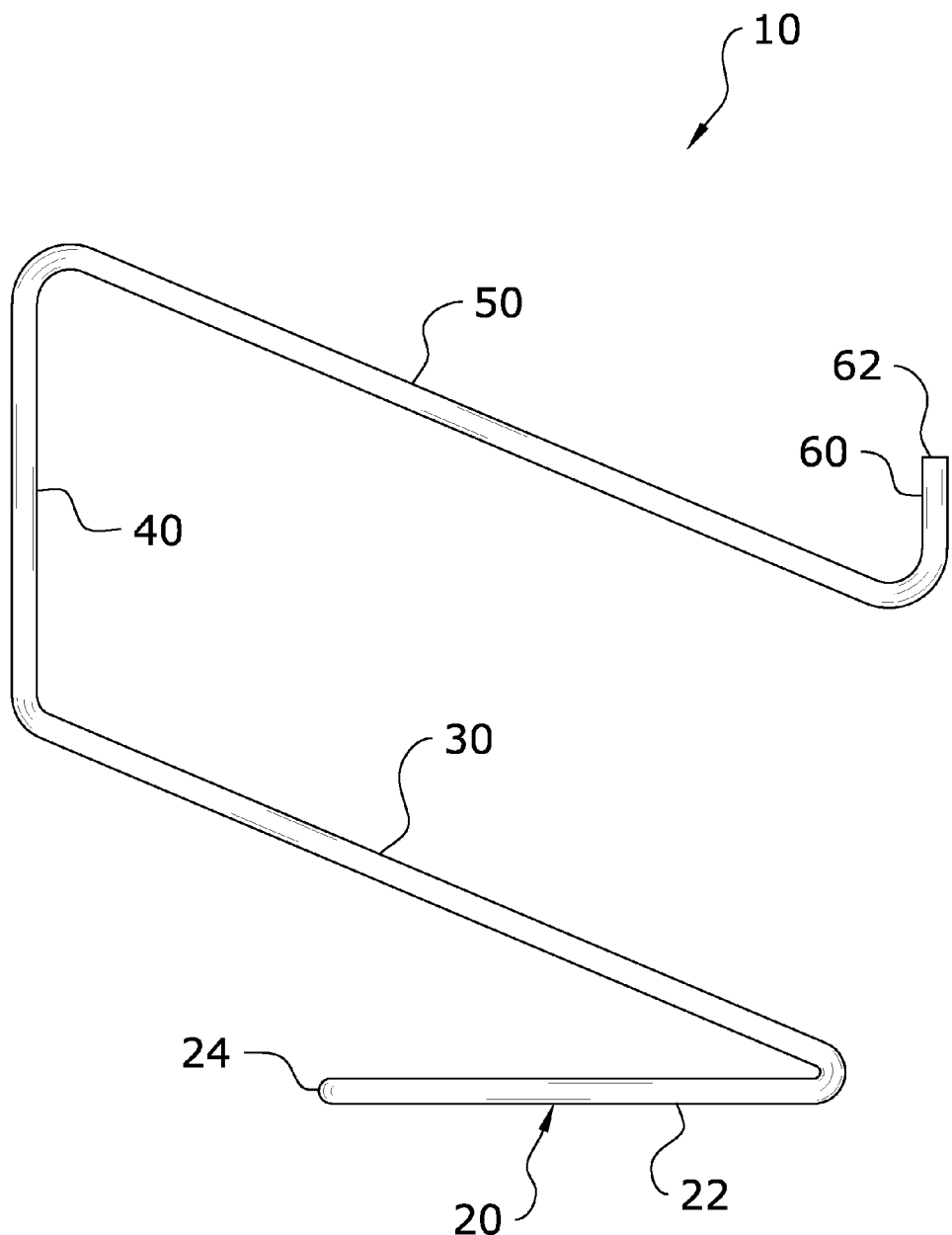
FIG. 3 is a side view of the present invention.
Figure 4:
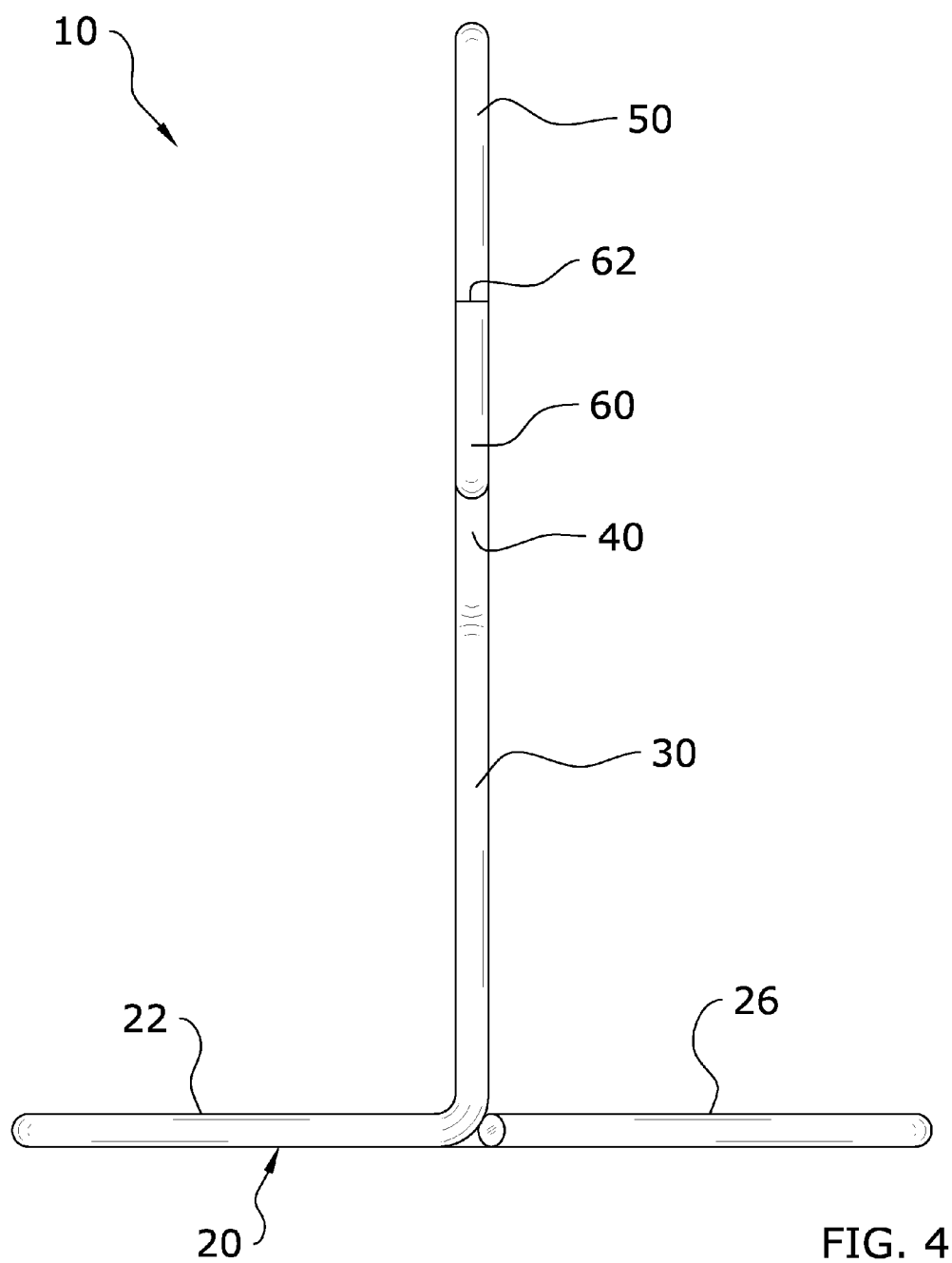
FIG. 4 is a front view of the present invention.

The first member 30 extends upwardly from a central end location of the base unit 20 at a first angle with respect to the base unit 20 as illustrated in FIGS. 2 and 3 of the drawings. The first member 30 extends above the base unit 20 and past the opposite side of the base unit 20 as best illustrated in FIG. 3 of the drawings. The first member 30 is preferably centrally positioned with respect to the base unit 20. The first member 30 is preferably comprised of a substantially straight structure.

F. Second Member.

The second member 40 extends upwardly from the distal portion of the first member 30 as best illustrated in FIG. 3 of the drawings. The second member 40 is preferably substantially vertical and straight as further shown in FIG. 3 of the drawings. The second member 40 provides adequate spacing between the first member 30 and the third member 50 to receive the poultry 12 as illustrated in FIG. 5 of the drawings.

G. Third Member.

The third member 50 extends downwardly from the second member 40 at a second angle with respect to the base unit 20. The third member 50 is preferably substantially straight as illustrated in FIG. 3 of the drawings. The first angle and the second angle are preferably substantially the same. The first angle and the second angle are preferably approximately 10-25 degrees with respect to the base unit 20 as illustrated in FIGS. 3 and 5 of the drawings.

Figure 6:
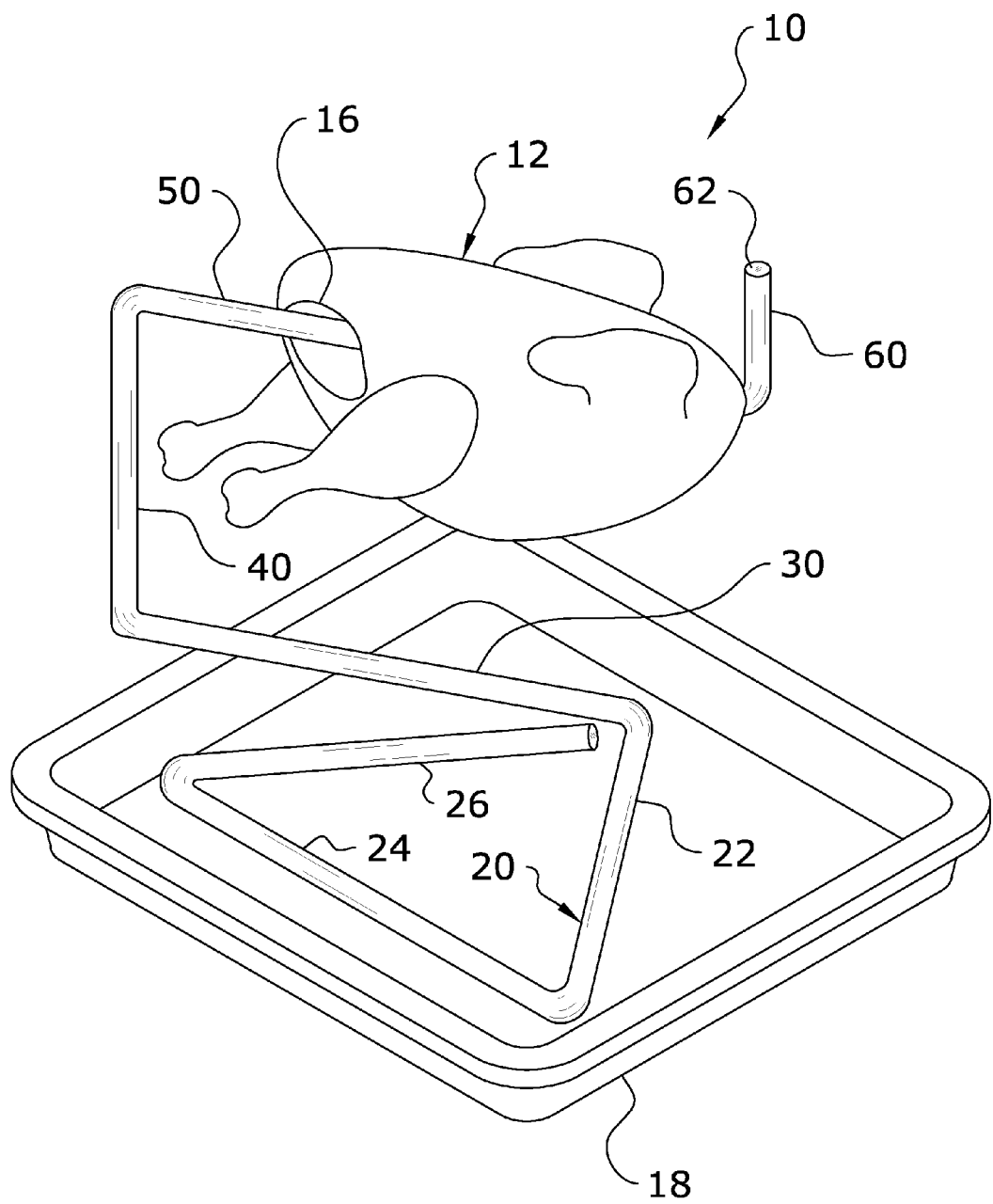
FIG. 6 is an upper perspective view of the present invention supporting a poultry in an inverted position with the breast facing downwardly.

The third member 50 is adapted to extend through the rear opening 16 and the neck opening 14 of the poultry 12 to support the poultry 12 in an inverted position for cooking as illustrated in FIG. 5 of the drawings. As shown in FIGS. 5 and 6 of the drawings, the inverted position for the poultry 12 is comprised of a breast portion of the poultry 12 being the lowest portion of the poultry 12 when positioned upon the third member 50. With the breast portion lower than the legs, the legs and breast portion are allowed to cook evenly within the oven. In addition, since the third member 50 extends through the interior of the poultry 12, there is little, if any, physical contact with the exterior surface of the poultry 12 allowing the exterior surface to cook evenly and in a crispy manner.

As illustrated in FIGS. 3 and 5 of the drawings, the third member 50 is preferably positioned above the first member 30. The third member 50 also preferably extends past the base unit 20 a finite distance as further illustrated in FIG. 3 of the drawings. As further shown in FIG. 3, the first member 30 and the third member 50 are substantially parallel with respect to one another and spaced apart sufficiently to allow for the receipt of the poultry 12 to be supported upon the third member 50 without the first member 30 touching the poultry 12.

The base unit 20, the first member 30, the second member 40 and the third member 50 are preferably comprised of a single elongated metal rod which is easy to manufacture and easy to clean. It is preferable that the single elongated metal rod is comprised of ¼ inch metal rod with an overall length of approximately 50 inches. The base unit 20 preferably is comprised of a 6"×6"×7.5" configuration. The first member 30 is preferably approximately 9 inches in length. The second member 40 is preferably approximately 5 inches in length and wherein the second member 40 may be utilized as a handle for a user to grasp during transportation of the present invention with the poultry 12 attached. The third member 50 is preferably approximately 10 inches in length. The hook 60 is preferably approximately 1.5 inches in length. The first member 30, the second member 40 and the third member 50 are preferably aligned along a common vertical plane as illustrated in FIG. 2 of the drawings.

H. Hook.

The hook 60 extends from the distal portion of the third member 50. The hook 60 includes an upper end 62 and is adapted to prevent the poultry 12 from sliding off the third member 50. The hook 60 preferably extends upwardly to engage an upper edge of the neck opening 14 when the poultry 12 is positioned upon the third member 50.

I. Foldable Alternative Embodiment.

Figure 7:
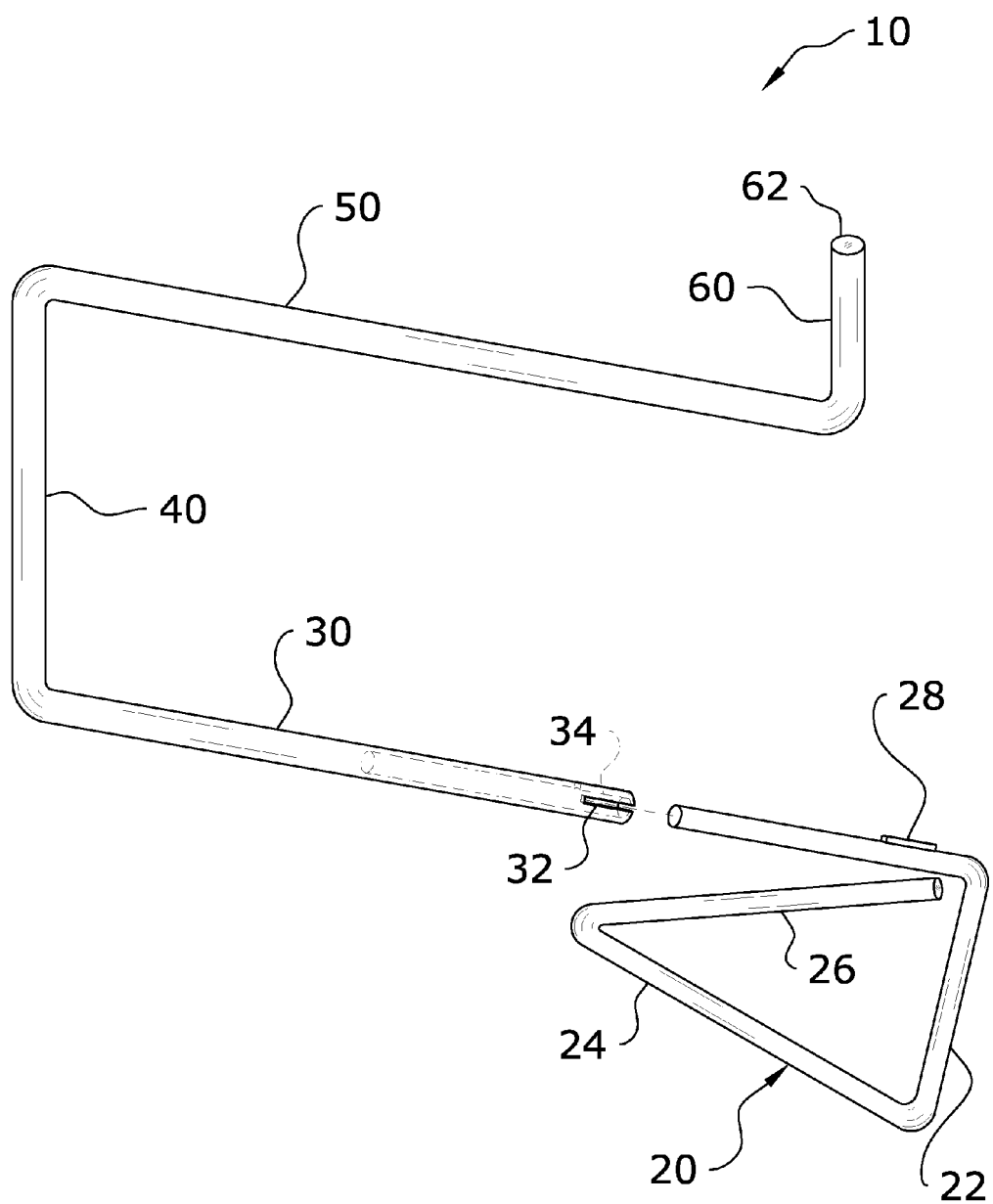
FIG. 7 is an exploded upper perspective view of an alternative embodiment that is foldable.
Figure 8:
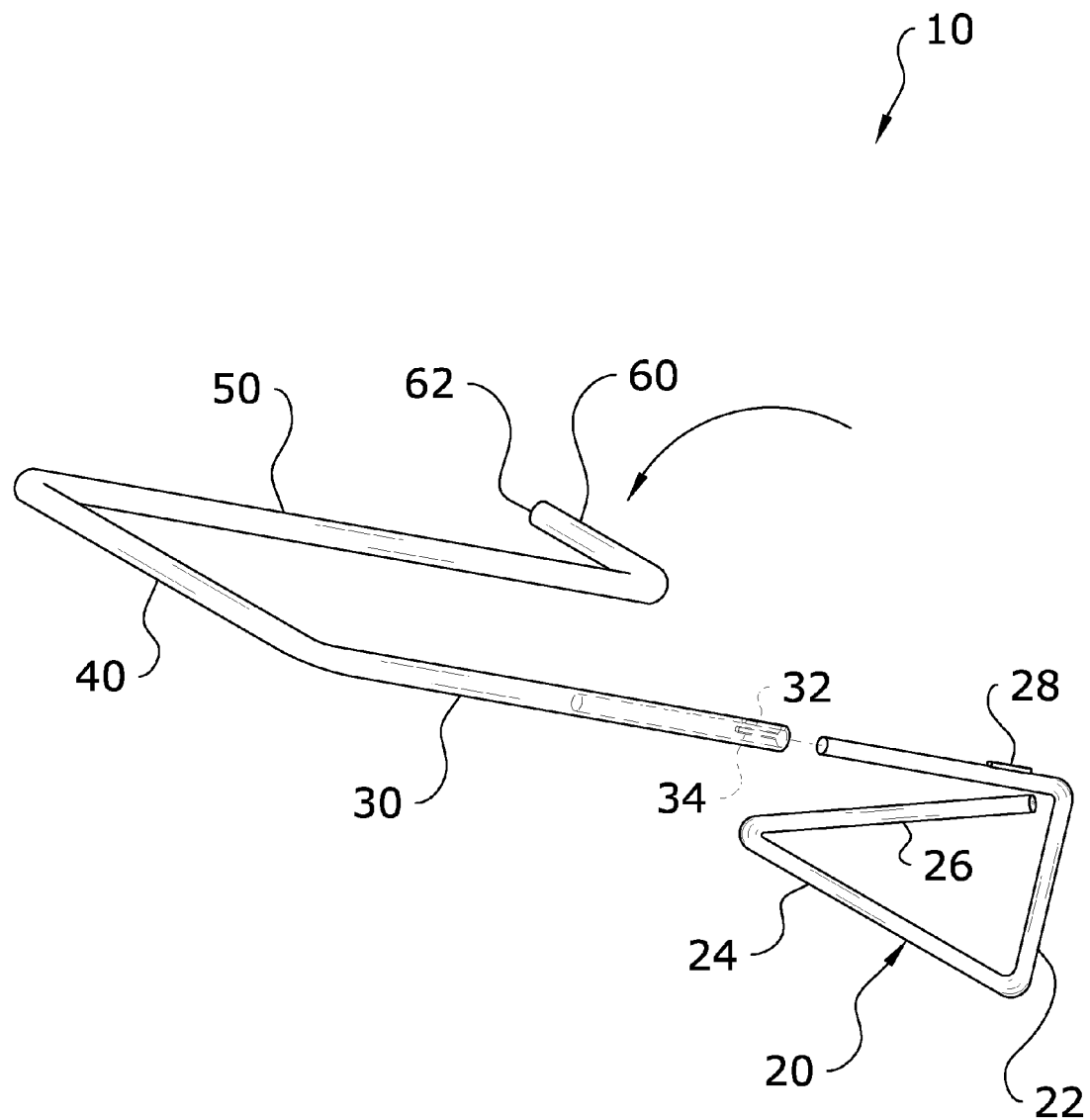
FIG. 8 is an exploded upper perspective view of the alternative embodiment with the first member rotated into a storage position.
Figure 9:
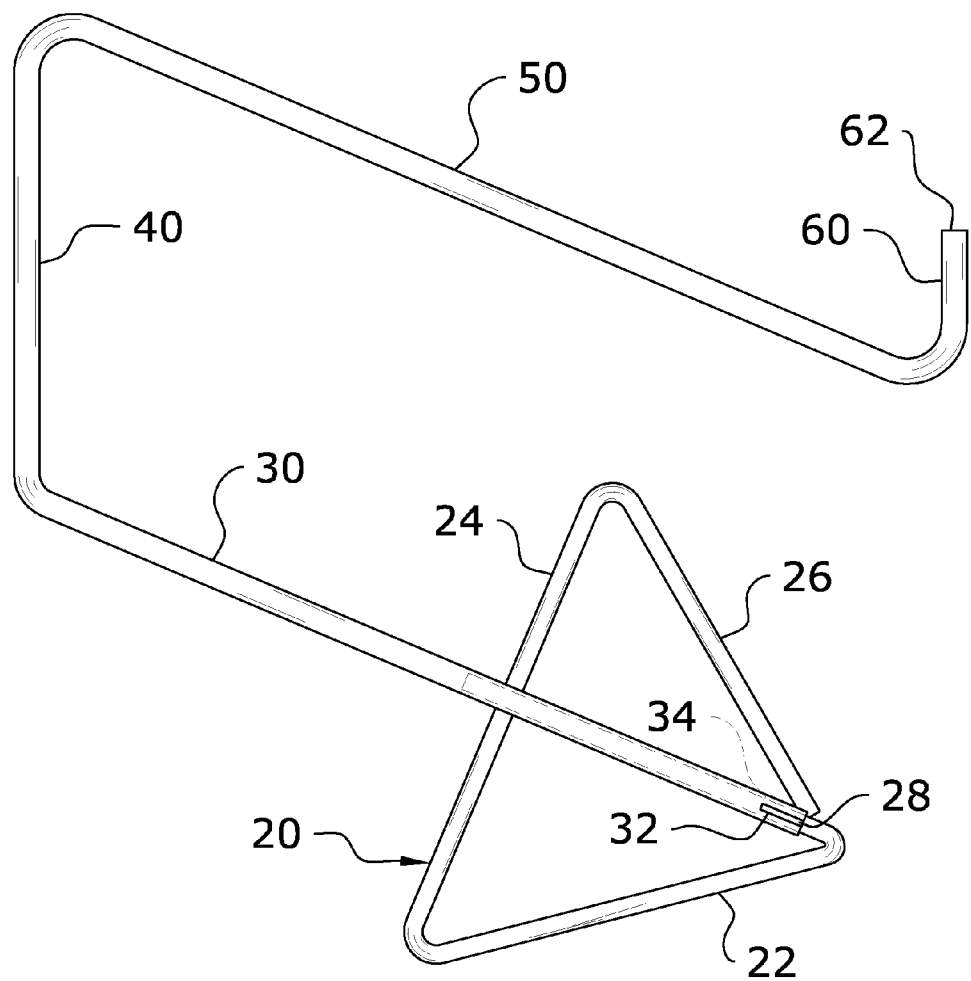
FIG. 9 is a top view of the alternative embodiment with the first member rotated and secured to the extended portion of the first base member.

FIGS. 7 through 9 illustrate an alternative embodiment wherein the first member 30 is comprised of a tubular structure having an open end that is slidable over an extended portion of the first base member 22. The extended portion from the first base member 22 extends concentrically at an angle similar to the angle of the first member 30 as illustrated in FIGS. 1 and 3 of the drawings. The extended portion from the first base member 22 has an exterior diameter smaller than the interior lumen of the first member 30. A ridge 28 extends outwardly from the extended portion of the first base member 22 as illustrated in FIGS. 7 and 8 of the drawings. The first member 30 includes at least one slot 32, 34 that catchably receives the ridge 28 when the first member 30 is positioned upon the extended portion of the first base member 22 to prevent rotation of the first member 30 upon the extended portion of the first base member 22 as illustrated in FIG. 9 of the drawings. There is preferably a first slot 32 and a second slot 34 within the distal portion of the first base member, wherein the first slot 32 is approximately 90 degrees from the second slot 34. The first slot 32 is utilized to secure the first member 30 in a rotated storage position to make the present invention flatter for storage as illustrated in FIG. 9 of the drawings. The second slot 34 is utilized to support the first member 30 in the upright position to support the poultry 12 positioned thereupon. It can also be appreciated that removal of the first member 30 from the extended portion of the first base member 22 allows for cleaning of the present invention and storage in separate locations.

J. Operation of Preferred Embodiment.

In use, the user extends the third member 50 through the rear opening 16 of the poultry 12 and out through the neck opening 14 of the poultry 12. The user then positions the poultry 12 so that the breast portion hangs downwardly in the lowest position as illustrated in FIGS. 5 and 6 of the drawings. The user may position the base unit 20 upon a pan 18 or other drip collection item prior to placing in an oven. During cooking, the leg meat is cooked evenly with the breast meat because the leg meat is higher in the oven than the breast. In addition, because of the downward angle of the third member 50 supporting the poultry 12 in a similar downward angle, the juices released from the poultry 12 during cooking are collected in the interior breast portion of the poultry 12 thereby enhancing the flavor of the breast meat. Furthermore, because no contact is made with the exterior of the poultry 12, the poultry 12 cooks more evenly as the hot air contacts every exterior surface of the poultry 12 during cooking resulting in an evenly crispy skin. After the poultry 12 is fully cooked, the user removes the cooked poultry 12 from the third member 50 by raising it upwardly over the hook 60 and then the poultry 12 may be served.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An inverted suspension poultry roasting rack system, comprising:
    a base unit;
    a first member extending upwardly from said base unit at a first angle with respect to said base unit;
    a second member extending upwardly from said first member;
    a third member extending downwardly from said second member at a second angle with respect to said base unit, wherein said third member is adapted to receive and support a poultry in an inverted position for cooking; and
    a hook extending from said distal portion of said third member, wherein said hook is adapted to prevent said poultry from sliding off said third member;
    wherein said first member and said third member are substantially parallel with respect to one another.

2. The inverted suspension poultry roasting rack system of claim 1, wherein said hook extends upwardly.

3. The inverted suspension poultry roasting rack system of claim 1, wherein said base unit is comprised of a broad structure.

4. The inverted suspension poultry roasting rack system of claim 1, wherein said base unit, said first member, said second member and said third member are comprised of a single elongated metal rod.

5. The inverted suspension poultry roasting rack system of claim 1, wherein said base unit is comprised of a triangular shape.

6. The inverted suspension poultry roasting rack system of claim 1, wherein said base unit is comprised of a first base member connected to said second member, a second base member extending at an acute angle from said first base member, and a third base member extending at an acute angle from said second base member.

7. The inverted suspension poultry roasting rack system of claim 1, wherein said first member is centrally positioned with respect to said base unit.

8. The inverted suspension poultry roasting rack system of claim 1, wherein said first member, said second member and said third member are aligned along a common vertical plane.

9. The inverted suspension poultry roasting rack system of claim 1, wherein said first angle and said second angle are substantially the same.

10. An inverted suspension poultry roasting rack system, comprising:
    a poultry having a neck opening and a rear opening;
    a pan;
    a base unit removably positionable upon said pan;
    a first member extending upwardly from said base unit at a first angle with respect to said base unit;
    a second member extending upwardly from said first member, wherein said second member is substantially vertical;
    a third member extending downwardly from said second member at a second angle with respect to said base unit, wherein said third member extends through said rear opening and said neck opening of said poultry to support said poultry in an inverted position for cooking, wherein said inverted position is comprised of a breast portion of said poultry being the lowest portion of said poultry when positioned upon said third member, and wherein said third member is positioned above said first member; and
    a hook extending from said distal portion of said third member, wherein said hook is adapted to prevent said poultry from sliding off said third member.

11. The inverted suspension poultry roasting rack system of claim 10, wherein said hook extends upwardly.

12. The inverted suspension poultry roasting rack system of claim 10, wherein said base unit is comprised of a broad structure.

13. The inverted suspension poultry roasting rack system of claim 10, wherein said base unit, said first member, said second member and said third member are comprised of a single elongated metal rod.

14. The inverted suspension poultry roasting rack system of claim 10, wherein said base unit is comprised of a triangular shape.

15. The inverted suspension poultry roasting rack system of claim 10, wherein said base unit is comprised of a first base member connected to said second member, a second base member extending at an acute angle from said first base member, and a third base member extending at an acute angle from said second base member.

16. The inverted suspension poultry roasting rack system of claim 10, wherein said first member is centrally positioned with respect to said base unit.

17. The inverted suspension poultry roasting rack system of claim 10, wherein said first member, said second member and said third member are aligned along a common vertical plane.

18. The inverted suspension poultry roasting rack system of claim 10, wherein said first angle and said second angle are substantially the same, and wherein said first member and said third member are substantially parallel with respect to one another.

19. An inverted suspension poultry roasting rack system, comprising:
    a poultry having a neck opening and a rear opening;
    a pan;
    a base unit removably positionable upon said pan, wherein said base unit is comprised of a broad structure;
    wherein said base unit is comprised of a triangular shape;
    wherein said base unit is comprised of a first base member connected to said second member, a second base member extending at an acute angle from said first base member, and a third base member extending at an acute angle from said second base member;
    a first member extending upwardly from a central location of said base unit at a first angle with respect to said base unit, wherein said first member extends above said base unit and past said base unit, and wherein said first member is centrally positioned with respect to said base unit;
    a second member extending upwardly from said first member, wherein said second member is substantially vertical;
    a third member extending downwardly from said second member at a second angle with respect to said base unit, wherein said third member extends through said rear opening and said neck opening of said poultry to support said poultry in an inverted position for cooking, wherein said inverted position is comprised of a breast portion of said poultry being the lowest portion of said poultry when positioned upon said third member, and wherein said third member is positioned above said first member;

wherein said first angle and said second angle are substantially the same, and wherein said first member and said third member are substantially parallel with respect to one another;

wherein said base unit, said first member, said second member and said third member are comprised of a single elongated metal rod;

wherein said first member, said second member and said third member are aligned along a common vertical plane; and a hook extending from said distal portion of said third member, wherein said hook includes an upper end, wherein said hook is adapted to prevent said poultry from sliding off said third member, and wherein said hook extends upwardly.

* * * * *